Sept. 28, 1943.  K. NÜCHTERLEIN  2,330,613
LIGHT METER FOR CAMERAS
Filed Jan. 23, 1940  2 Sheets-Sheet 1
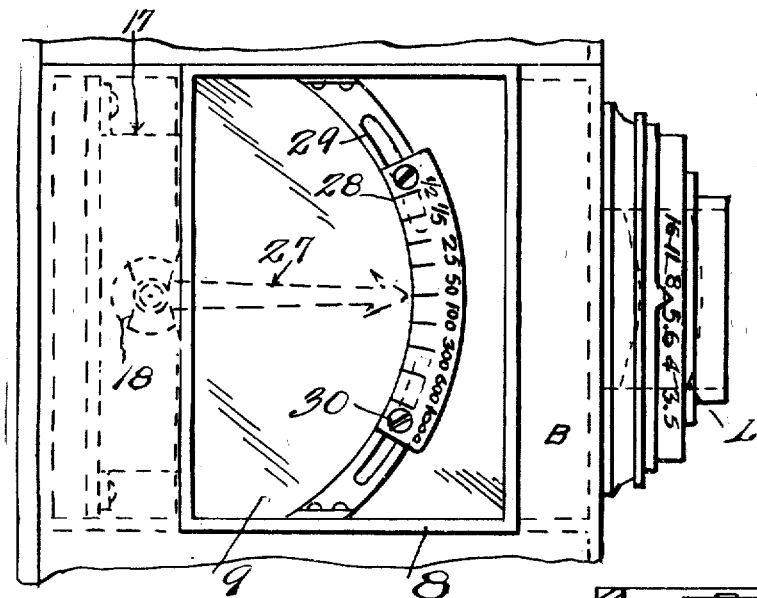
Inventor
KARL NÜCHTERLEIN
By
Chas K. Davies + Son
Attys.

Sept. 28, 1943. K. NÜCHTERLEIN 2,330,613
LIGHT METER FOR CAMERAS
Filed Jan. 23, 1940 2 Sheets-Sheet 2
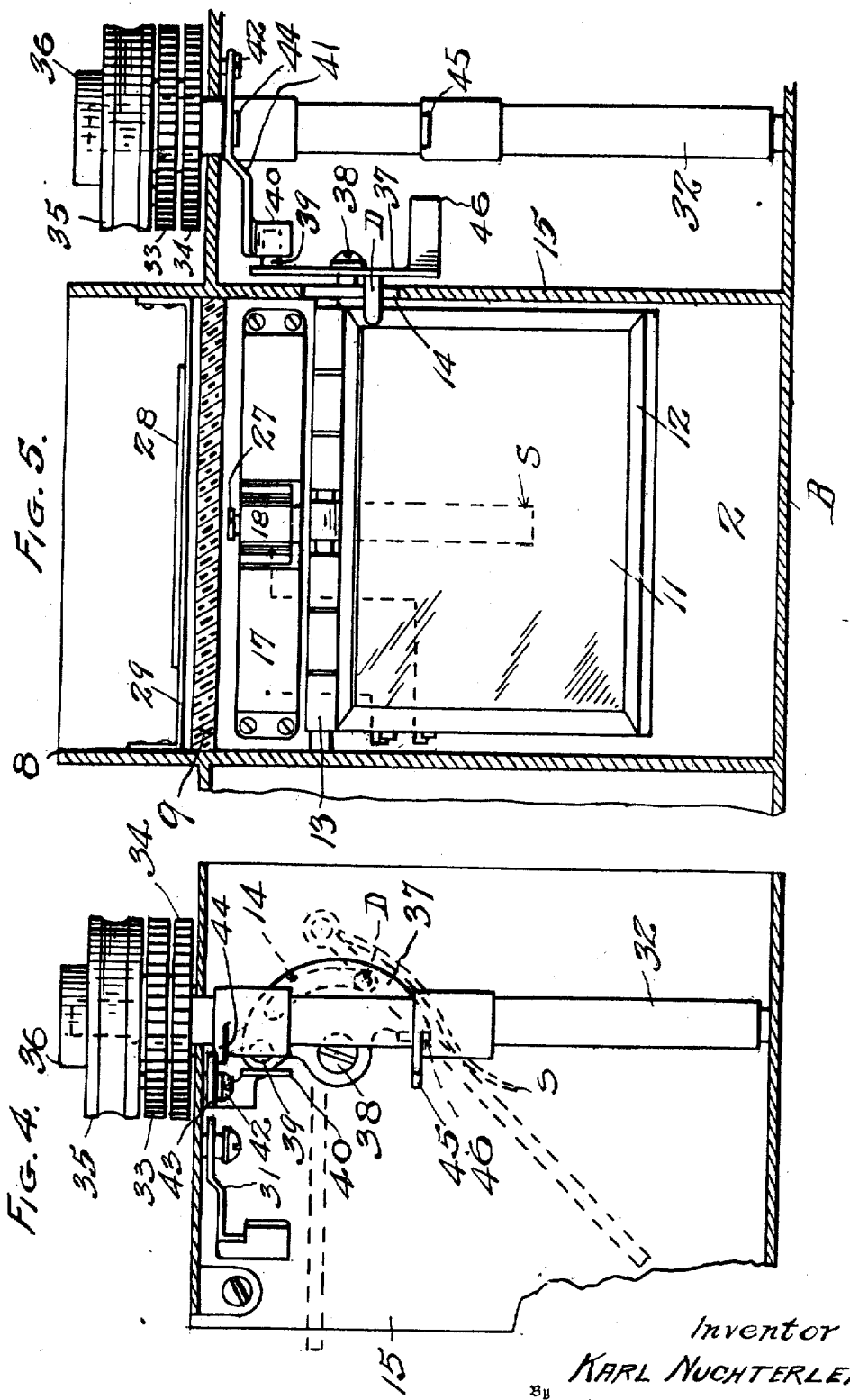
Inventor
KARL NÜCHTERLEIN
By Chas K. Davies + Son
Attys.

Patented Sept. 28, 1943

2,330,613

UNITED STATES PATENT OFFICE 2,330,613

LIGHT METER FOR CAMERAS

Karl Nüchterlein, Dresden, Germany; vested in the Alien Property Custodian

Application January 23, 1940, Serial No. 315,263
In Germany October 15, 1935

4 Claims. (Cl. 88—23)

My present invention relates to an improved light meter for cameras of the reflex type, for measuring and automatically registering or indicating the intensity of light to facilitate the taking of pictures. The invention resides essentially in the use of a light-sensitive cell or a photo-electric cell of the photovoltaic type located in the light chamber of the camera, in conjunction with the use of a focusing screen upon the lower face of which the image is reflected from a focusing mirror. This focusing mirror is located in the light chamber of the camera and in its optical axis to intercept and then reflect the light beam which is transmitted through the objective lens of the camera.

While the light meter is particularly designed for use in minature cameras of the reflex type, and especially valuable in taking colored pictures, it will be understood that the principles of the invention may be employed in other suitable cameras and in taking other types of pictures.

In carrying out my invention as herein illustrated, the light meter or photo-electric cell, and the needle pointer of the indicator operated thereby, are both located within the light chamber of the camera. In this specific embodiment of the invention the sensitive cell is preferably mounted on and forms part of a reflex focusing mirror, and the sensitive cell together with the magnet connected therewith, are located beneath the focusing screen that forms part of the top wall of the light chamber. The scale-plate, with which the needle co-acts is located exterior of the light chamber and over or above the translucent focusing screen.

The focusing mirror with the sensitive-cell is hinged or pivotally supported in the light chamber in the optical axis and focal plane of the camera for focusing purposes. For picture-taking purposes the focusing mirror is automatically removed from the optical axis by swinging into the top portion of the light chamber in position substantially parallel with and beneath the focusing screen or ground glass plate, for the purpose of assisting in preventing access of light from above to the light chamber. Thus the photoelectric cell of the meter is associated with the focusing mirror to move therewith to and from the two respective positions of the mirror with relation to a light beam passing through the objective lens and the optical axis of the camera.

By this novel and compact arrangement of the light-meter and indicator needle, with the latter directly under the fixed focusing screen or ground glass plate, a simultaneous focusing of the image on the screen is accomplished, with an indication on the exterior scale-plate, of the intensity of the light beam, so that the timing mechanism may with accuracy be adjusted for the purpose of acquiring a clear cut picture.

This localizing or co-ordinating of the needle with the image on the focusing screen, and consequent simultaneous observation of both the image and the indicator needle and scale plate, to determine the time or period of exposure is especially advantageous in taking pictures with a roll-film in natural colors.

The automatic removal of the mirror from focusing postion to picture-taking position is accomplished in connection with the advancing of the film and the setting of the focal plane shutter of the camera, and by this arrangement it is possible to regulate the needle pointer or indicator of the meter with relation to the desired time-exposure for which the shutter has been set, thereby facilitating the focusing of the camera and increasing the accuracy of the exposure for a clear cut picture.

For instance, if the shutter has been set for one-fiftieth second exposure time, and the needle shows one one-hundredth second on the scale plate, then by stopping down the objective lens in accord with the scale shown on the lens mount, it is possible to employ the shutter as previously set, due to the fact that the needle, now, also, shows an exposure-time of one fiftieth second.

The present invention differs essentially from other meters or like nature, in that while the other meters are activated by contact from a light beam reflected from an object in a finder that is located in position exterior of the camera and remote from the objective lens and optical axis of the camera, the present meter is activated by a light beam passing from the camera objective directly along the optical axis of the camera to the focusing mirror and the photo-electric cell of the meter forming part of the focusing mirror and located within the light chamber of the camera.

In the accompanying drawings I have illustrated one example of the physical embodiment of my invention, but it will be understood that changes and alterations may be made in these exemplifying structures, within the scope of the appended claims without departing from the principles of the invention.

Figure 1 is a top plan view of the central portion of a reflex camera of the roll-film, focal shutter, type, showing a conventional hood above the camera and above the ground glass or focusing screen, together with the scale plate exterior of or above the focusing screen, and indicating by dotted lines the magnet and oscillatable needle below the ground glass, the needle only being visible through the transluscent focusing screen.

Figure 2 is a vertical central view through the central light chamber of the camera, indicating the roll-film, focal shutter and objective lens and with the focusing mirror in focusing position.

Figure 3 is an enlarged, detail central sectional view, transversely of the magnet or magnetic bar and the oscillator upon which the needle is mounted, together with a diagrammatic showing of the leads or wires between the photo-electric cell and the magnetic bar and oscillator respectively.

Figure 4 is a sectional view transversely of a compartment of the camera exterior of the light chamber, showing the operating means for swinging the focusing mirror to focusing position and for releasing the mirror so that it automatically swings to picture-taking position, out of the optical axis of the camera.

Figure 5 is a longitudinal sectional view of part of the camera showing the light chamber with the reflecting mirror in focusing position, and also showing the operating means of Figure 4.

In the drawings I have illustrated the required parts of a miniature camera for a clear understanding of the construction, arrangement, and operation of the parts forming my invention. In Figs. 1, 2, and 5, I have indicated the body of the camera as B having a dark chamber 1 and a light chamber 2 at the central portion thereof, and the light chamber is provided with front and rear apertures 3 and 4 respectively along the optical axis of the camera, and back of the adjustable objective lens L. At the rear of the light aperture 4 an located in the dark chamber are indicated a focal plane, two-curtain, shutter 5, the film strip 6 and the back plate 7 of the camera.

A conventional focusing hood 8 is shown on top of the central part of the camera, and the usual ground glass plate 9 is fixed at the bottom of the hood and forms part of the top wall of the light chamber. The ground glass plate, which is transluscent, on its bottom face, provides the focusing screen for an image of the picture to be taken, and the image is visible to the observer peering down through the hood.

In Figure 2 the optical axis of the camera is indicated by the dot and dash horizontal line, and the focal plane is indicated partly by the optical axis and by the perpendicular dot and dash line passing from the reflecting mirror in the light chamber through the focusing screen.

The meter for measuring and indicating the intensity of the light beam entering the light chamber along the optical axis of the camera is located within the chamber, and in this specific construction embodied in the drawings, the sensitized cell or photo-electric cell, in the nature of a suitable metal plate 10, is mounted back of or beneath the transparent glass plate 11 of the mirror. As best seen in Figure 2, where the focusing mirror is shown in section, these two plates 10 and 11 are held together in suitable manner, as by a frame or open housing 12, and the cell-plate 10, which is located under or back of the transparent glass plate 11 forms the opaque backing or reflector of the focusing mirror, as indicated in the sectional view of the hinged mirror in Figure 2.

Thus in Figure 2 where the focusing mirror is in focusing position, the front horizontal line of the optical axis, after passing through the camera objective, impinges against the focusing mirror, which is disposed at approximately an angle of forty-five degrees to the plane of the optical axis, and the image is reflected or transmitted from the focusing mirror, as indicated by the perpendicular dot and dash line, to the focusing screen on the ground glass plate 9.

When the focusing mirror is removed from the path of the light beam, the beam passes along the optical axis of the light chamber, through the front and rear apertures 3 and 4 for an exposure.

The focusing mirror is hinged in the light chamber at 13 and retained in focusing position in suitable manner, as by a detent D projecting through a slot 14 in the side wall or frame 15 of the light chamber, or other suitable means may be employed for this purpose. In the present instance, when the detent D is withdrawn from the mirror, preparatory to an exposure, the mirror is automatically lifted or swung to approximately horizontal position, indicated by dotted lines in Fig. 4, by means of a spring, as for instance the spring blade S mounted in suitable manner on the hinge bar or pivot bar of the focusing mirror. The upward swing of the mirror is limited by a flange or stop-wall 16 depending from the top wall of the light chamber.

As best seen in Figure 3, the photoelectric meter also includes a magnet or magnetic bar 17 fixed in suitable manner in the upper part of the light chamber, above the mirror, which bar is recessed at its front face to accommodate a central oscillator 18 suitably journaled in a bearing as 19 supported in the recessed magnetic bar, and the oscillator is provided with coils 20 as usual.

The meter magnet 17 and the photoelectric cell plate 10 are connected by two leads or wires 21 and 22, each connected at one end to the cell plate at 23 and 24, and the other end of one lead is connected to the magnetic bar at 25, while the other end of the other lead or wire is connected to the coil 20 of the oscillator at 26.

On the top of the oscillator is mounted a needle or pointer 27 which projects horizontally beneath the focusing screen or transluscent glass plate 9, so that the needle is visible to the observer when peering down through the hood and focusing screen for focusing purposes.

The needle is centered below the ground glass plate, but it co-acts with a scale plate 28 located directly over or above the ground glass focusing screen 9, as best indicated in Figure 1. The scale plate is supported and adjustable for precision and accuracy, on a slotted arcuate bracket or bridge 29, and secured in precise position by screws 30, the bridge or bracket being attached at its ends to the opposite walls of the hood 8. The scale plate is divided and provided with periods of time in seconds and fractions, and it is co-ordinated with the usual scale shown in Figure 1 on the lens mount.

In operation, the scale plate 28 is first adjusted on its slotted bracket to position that will compensate for variations in film emulsions speeds, and this adjustment becomes necessary only when a roll-film of a different emulsion speed is employed.

After the scale has been properly adjusted, and for focusing purposes, the objective lens L, with its diaphragm at its widest open stop, for instance at f3.5, is directed or pointed toward the object or scene to be photographed, it being understood, of course, that the focusing mirror is in the focusing position of Figure 2, and that the observer is peering down through the hood, the exterior light reflected by the object end passing through the objective lens along the optical axis of the camera penetrates the transparent glass 11 and impinges against the reflecting surface of the mirror, and of course contacts with the photoelectric cell 10. This contact of light with the cell plate activates the cell and actuates the magnet, together with the armature of oscillator, to move the needle of pointer 27 with relation to the scale plate. When the needle reaches its maximum point of movement it will indicate a shutter speed of say one one-hundredth second, for use in photographing the object.

However, as it is ordinarily desirable to employ the least or smallest possible diaphragm stop to obtain the greatest depth of focus, the lens diaphragm should be stopped down say to the next lens opening on the scale which is f4, whereupon, due to the decrease of the amount or intensity of the exterior reflected light passing through the objective lens, the needle 27 will move on the scale to the next longer shutter speed, i. e. one-fiftieth second.

If the object to be photographed is stationary, or has only a slight movement the diaphragm may be further closed, as to f5.6 whereupon the needle will move to the next, slower, shutter speed indication one-twenty-fifth second. It will thus be apparent that the size of the diaphragm aperture and the speed of the shutter are automatically co-ordinated, thus obviating any necessity for calculations by the photographer, and the only factor remaining for the photographer's judgment is the speed of the shutter 5.

The timing or speed of the focal plane shutter and its release; advancing of the roll-film; and the removal of the focusing mirror, through action of the spring S, after the mirror has been moved to focusing position, may be accomplished in any suitable manner, or by means of the operating mechanism illustrated in Figures 4 and 5.

The timing action of the shutter is manually adjusted and set, and the focal plane shutter comprising the two curtains with apertures therein is released through the movement of an operating lever 31, by pressing a button, or in other manner.

For setting the shutter two concentric gears 33 and 34 are mounted on the shaft 32, and above the gears is shown a loose shutter-setting disk 35 bearing notations and data for the timing of high speed exposures in seconds complementary to the notations on the scale plate 28, a spring-pressed setting cap 36 being mounted in this disk.

The film-feed mechanism, the shutter mechanism, and the mechanism for depressing the detent D to set the shutter in focusing position as well as to release the shutter from the detent, are co-ordinated, so that the focusing mirror is removed from the optical axis of the camera in advance of the shutter-exposure movement.

The detent D is rigidly mounted on one side of an oscillatable arcuate plate 37 pivoted at 38 on the exterior face of the wall 15 of the light chamber. Another oppositely extending pin 39 is mounted on this plate, and this latter pin engages a flange 40 integral with a spring lever 41 pivoted at 42 on the underside of the upper wall of the camera at right angles to the plane of the oscillatable plate 37 and adjacent the rotary shaft 32, between said shaft and the operating lever 31. A flange 43 on lever 41 cooperates wtih lug 44 on the shaft 32, and lug 40 engages pin 39 to swing plate 37 and detent D of this plate depresses the wirror to focusing position. When the exposure is about to be made a reverse movement of the shatf 32 causes lug 45 to engage flange 46 of the plate 37, thereby swinging the plate to withdraw the detent D from the mirror, so that the spring S may swing the mirror out of the optical axis of the camera and out of focusing position, and into picture-taking position at the top of the light chamber.

Having thus fully described my invention, what I claim as new and desire to secure by Letters Patent is:

1. The combination in a reflex camera having a light chamber and a focusing screen forming a wall thereof, a movable focusing mirror located in said chamber, and a photoelectric cell mounted on the mirror, of a magnet mounted in the chamber, an oscillatible armature for the magnet, connections between said cell, magnet, and armature, a needle on the armature associated with the inner face of the screen and variably displaced in accord with the intensity of light impinging on said cell, and a complementary scale associated with the outer face of the screen.

2. In a reflex camera having a light chamber, a focusing screen forming a wall of the light chamber and a focusing mirror movably mounted in said chamber and adapted to receive light from the object to be photographed, said mirror being movable into and out of focusing position, the combination of a photoelectric cell carried by said mirror, said cell being located within said chamber and adapted to receive light from the object when the mirror is in focusing position, a scale plate mounted at one side of the focusing screen and an indicating meter-element mounted in said chamber adjacent the inner face of said screen, said meter element being operatively connected to said cell and variably displaced in accordance with the intensity of the light falling on said cell.

3. The combination in a reflex camera as defined in claim 1 including means for adjustably mounting said scale whereby the scale may be moved relative to said needle to compensate for the light sensitivity of films of different emulsion speeds which are used with the camera.

4. The combination in a reflex camera as defined in claim 1 including graduations on said scale in terms of time intervals and means carried by said camera and supporting said scale means above said screen whereby said scale is adjustable in substantially parallel relation to the path traveled by the end of the needle during movement of the needle by the armature.

KARL NÜCHTERLEIN.